(12) United States Patent
Wicken

(10) Patent No.: US 12,024,133 B2
(45) Date of Patent: Jul. 2, 2024

(54) COLLAPSIBLE SIDE MOUNTING EQUIPMENT RACK

(71) Applicant: Gregg Allen Wicken, Longmont, CO (US)

(72) Inventor: Gregg Allen Wicken, Longmont, CO (US)

( * ) Notice: Subject to any disclaimer, the term of this patent is extended or adjusted under 35 U.S.C. 154(b) by 0 days.

(21) Appl. No.: 17/699,137

(22) Filed: Mar. 20, 2022

(65) Prior Publication Data

US 2023/0294615 A1    Sep. 21, 2023

(51) Int. Cl.
*B60R 9/12* (2006.01)
*B60R 9/06* (2006.01)

(52) U.S. Cl.
CPC . *B60R 9/12* (2013.01); *B60R 9/06* (2013.01)

(58) Field of Classification Search
CPC .... B60R 9/06; B60R 9/12; B60R 9/08; B60R 9/10
See application file for complete search history.

(56) References Cited

U.S. PATENT DOCUMENTS

| | | | | |
|---|---|---|---|---|
| 4,236,854 A * | 12/1980 | Rogers | B60P 7/15 | 410/151 |
| 4,271,997 A * | 6/1981 | Michael | B60R 5/006 | 224/547 |
| 4,469,257 A * | 9/1984 | Parker | B60R 9/12 | 224/570 |
| 4,720,031 A * | 1/1988 | Zimmerman | B60R 9/12 | 224/323 |
| 4,863,082 A * | 9/1989 | Evans | B63B 32/83 | 224/406 |
| 4,971,234 A * | 11/1990 | Hay | B25H 5/00 | 414/532 |
| 4,997,116 A * | 3/1991 | Grim | B60R 9/06 | 224/532 |
| 5,092,504 A * | 3/1992 | Hannes | B60R 9/00 | 224/570 |
| 5,127,564 A * | 7/1992 | Romero | B60R 9/00 | 224/570 |
| 5,316,192 A * | 5/1994 | Ng | B60R 9/12 | 224/324 |
| 5,906,304 A * | 5/1999 | Baldacchino | B63B 32/83 | 224/543 |
| 5,988,722 A * | 11/1999 | Parri | B60P 1/003 | 224/403 |
| 6,019,265 A * | 2/2000 | Deloza | B60R 9/08 | 224/571 |

(Continued)

FOREIGN PATENT DOCUMENTS

DE    1680166 A1 *  9/1971

*Primary Examiner* — Stanton L Krycinski
(74) *Attorney, Agent, or Firm* — Will Hunziker

(57) ABSTRACT

An equipment mounting system utilizing sliding mounting brackets attached to siderails or front rails, rotating pivots, and movable bases that allow the mounting system to rotate sideways against the sides of the vehicle bed into a storage position when not in use, allowing the user to have full access to the bed of the vehicle without the need to uninstall the mounting system. The design of the equipment mounting system allows it to be installed, used, and stored above the wheel well of a pickup truck while still allowing for a "bed cover" or tonneau cover to be used over the equipment mounting system.

18 Claims, 5 Drawing Sheets

(56) References Cited

U.S. PATENT DOCUMENTS

| | | | | |
|---|---|---|---|---|
| 6,641,014 B2 * | 11/2003 | McNalley | | F41B 5/14 |
| | | | | 224/916 |
| 6,732,984 B2 * | 5/2004 | Tsai | | A47F 5/0006 |
| | | | | 248/161 |
| 6,834,786 B2 * | 12/2004 | Hansen | | B60R 9/10 |
| | | | | 211/20 |
| 7,246,731 B1 * | 7/2007 | Matherne, Sr. | | B60P 3/073 |
| | | | | 224/403 |
| 7,857,177 B2 * | 12/2010 | Reeves | | B60R 9/10 |
| | | | | 224/403 |
| 8,985,415 B2 * | 3/2015 | Heininger | | B60P 3/07 |
| | | | | 224/403 |
| 9,221,402 B2 * | 12/2015 | Ressler | | B62H 3/00 |
| 9,254,792 B2 * | 2/2016 | Patton | | B60R 11/00 |
| 9,327,633 B1 * | 5/2016 | Patton | | B60P 3/125 |
| 9,487,152 B2 * | 11/2016 | Scott | | B60R 9/045 |
| 9,493,123 B2 * | 11/2016 | Martin | | B60R 9/00 |
| 9,505,333 B2 * | 11/2016 | Jobe | | B60R 9/06 |
| 9,862,330 B2 * | 1/2018 | Sayegh | | B60R 9/06 |
| 10,131,289 B2 * | 11/2018 | Frederick | | B60R 9/08 |
| 10,252,680 B2 * | 4/2019 | Presley | | B60P 7/135 |
| 10,435,082 B1 * | 10/2019 | Kupina | | B60P 1/486 |
| 10,478,685 B2 * | 11/2019 | Fenoglio | | A63B 55/50 |
| 10,513,227 B2 * | 12/2019 | Merino | | B60R 9/10 |
| 10,703,295 B2 * | 7/2020 | Leff Yaffe | | B60R 9/06 |
| 10,800,464 B2 * | 10/2020 | Binley | | B60R 9/06 |
| 10,870,397 B2 * | 12/2020 | Pokriefka | | B60R 11/02 |
| 11,225,188 B2 * | 1/2022 | Bossenbroek | | B60P 7/10 |
| 11,267,406 B2 * | 3/2022 | Deighton | | B62D 33/0207 |
| 11,304,516 B2 * | 4/2022 | McCardle | | B60R 9/06 |
| 11,345,291 B2 * | 5/2022 | Moreno Castro | | B60R 9/06 |
| 2007/0110539 A1 | 5/2007 | Klinkman | | B60P 7/15 |
| | | | | 410/150 |
| 2011/0024469 A1 * | 2/2011 | Key | | A63B 55/60 |
| | | | | 224/274 |
| 2019/0047483 A1 * | 2/2019 | Wilterdink | | B60P 3/079 |
| 2020/0031289 A1 * | 1/2020 | Williams | | B60R 9/045 |
| 2021/0178980 A1 * | 6/2021 | Wang | | B60R 9/06 |

* cited by examiner

COLLAPSIBLE SIDE MOUNTING EQUIPMENT RACK

BACKGROUND OF THE INVENTION

1. Field of the Invention

The present invention relates to retaining systems, and more particularly to equipment stowing and retaining systems for attaching and retaining sporting equipment to a vehicle.

2. Description of Related Art

"Racks" and other mounting systems for mounting items to vehicles are well known in the art. These systems typically attach to rails, hard mounts, or other attachment points on a vehicle. Often these attachment points are positioned on the roof, or on the top of the perimeter of the bed of a truck. These mounting systems typically are fixed in place and need to be removed to use the bed of the truck.

A very common method of equipment mounting n a vehicle is to use a rack that is installed on top of the pickup truck bed. These racks are designed to mount equipment above the topmost surface of the truck bed's perimeter edges or above the cab of a vehicle. These conventional types of racks pose an inherent problem as most of them are not compatible with tonneau-type bed covers that either fold as panels or roll up towards the cab of the pickup truck while those installed onto the roof are difficult to reach and access equipment thereon. Such systems also leave both the rack and the equipment exposed and unprotected from the elements. A third option is to install a rack in the bed of the truck; however, this third option introduces the extra step of needing to install and remove the rack each time you need to use the full width of the bed of the truck to store other equipment.

The present rack storage systems fail to disclose a system that fits below the top of the perimeter of the bed of a truck and in the bed of a truck while also conveniently folding away to the side of the truck bed when not in use, thereby making the full width of the truck bed available for storage of other equipment when not in use. The present storage system also allows for the unimpeded use of pickup truck tonneau and other truck bed covers that do not raise the height of the bed of the tuck significantly above the top of the perimeter of the bed of a truck. The present invention provides a solution to these and other problems.

SUMMARY

The scope of the present invention is defined solely by the appended claims and detailed description of a preferred embodiment and is not affected to any degree by the statements within this summary. The mounting system disclosed herein overcomes known problems in the art related to a lack of mounting locations on vehicles for equipment transportation and storage. A mounting system utilizing an angled folding system to fold itself into the sides of the truck bed over a wheel well when not in use. The mounting system is also designed to be installed inside the bed of a truck and still allow for a "bed cover" or tonneau cover to be used over the mounting system so that the mounting system and equipment mounted therein remain safely inside the vehicle. The mounting system may be made to have modular components and to have interchangeable rack fittings to effectively store specific types of equipment. Additional features of the invention are described in the detailed description, drawings, and claims below.

BRIEF DESCRIPTION OF THE DRAWINGS

Various embodiments are described herein with reference to the following Drawings. Not all alternatives and options are shown in the Drawings and, therefore, the Claims are not limited in scope to the content of the Drawings. Elements in the several figures are illustrated for simplicity and clarity and have not necessarily been drawn to scale. Also, common, but well-understood elements that are useful or necessary in commercially feasible embodiment are often not depicted to facilitate less obstructed views of these various embodiments of the present disclosure.

1. FIGURES

Figure 1:
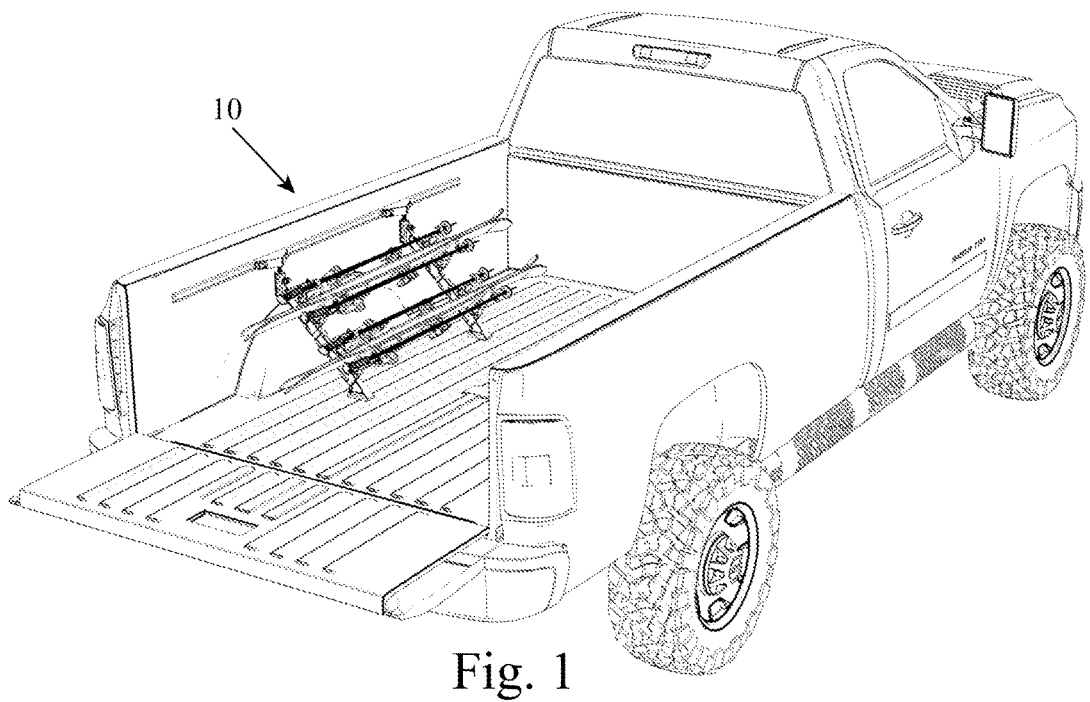

FIG. 1 illustrates a perspective view of an equipment mounting system in use, in accordance with an embodiment of the present disclosure.

Figure 2:
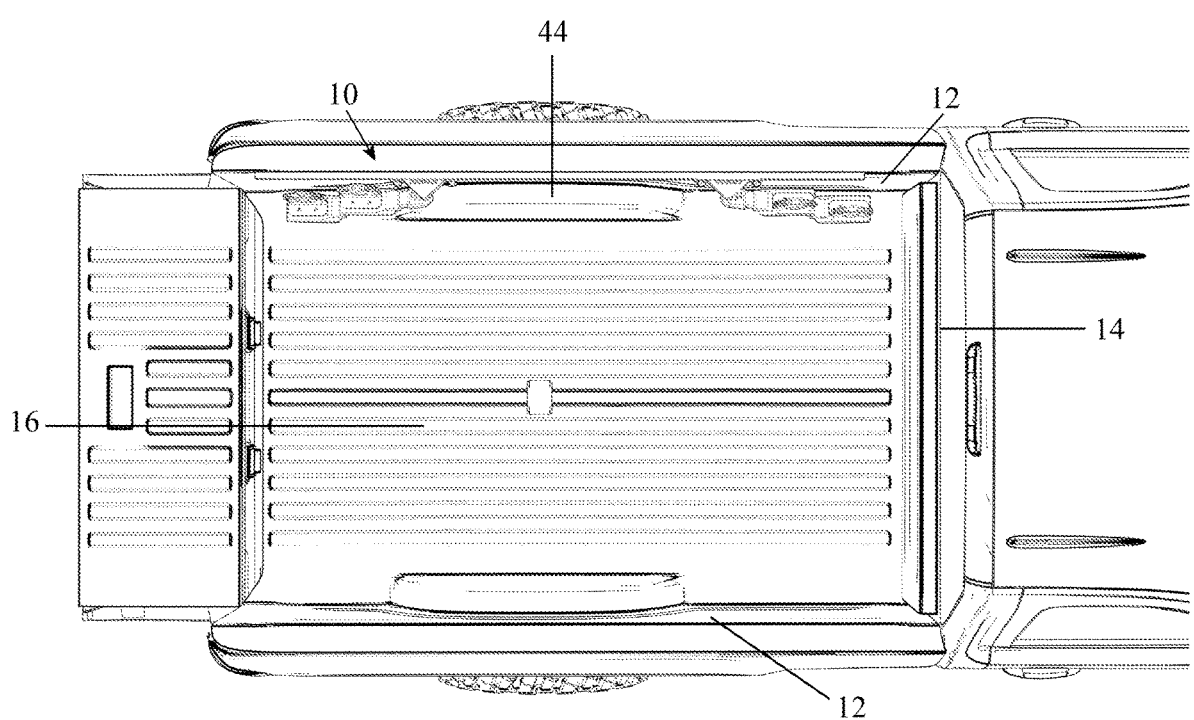

FIG. 2 illustrates a top view of the embodiment of the equipment mounting system shown in FIG. 1 when not in use.

Figure 3:
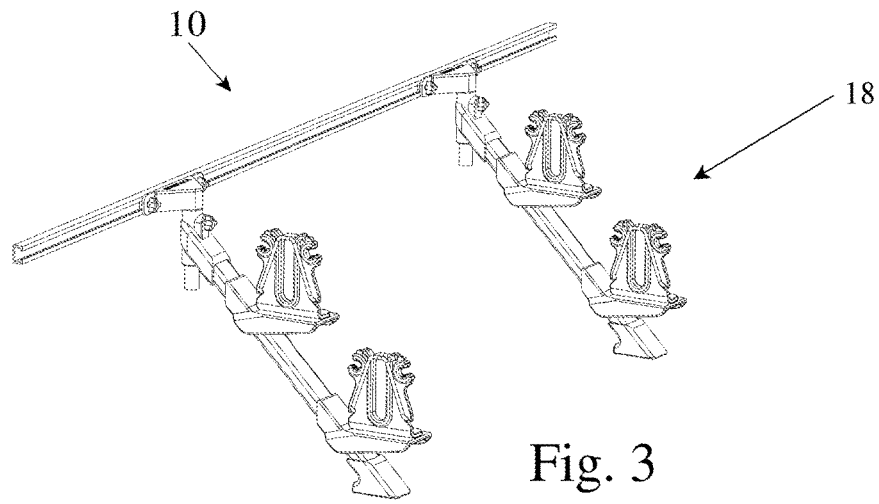

FIG. 3 illustrates a perspective view of an empty equipment mounting system, in accordance with an embodiment of the present disclosure.

Figure 4:
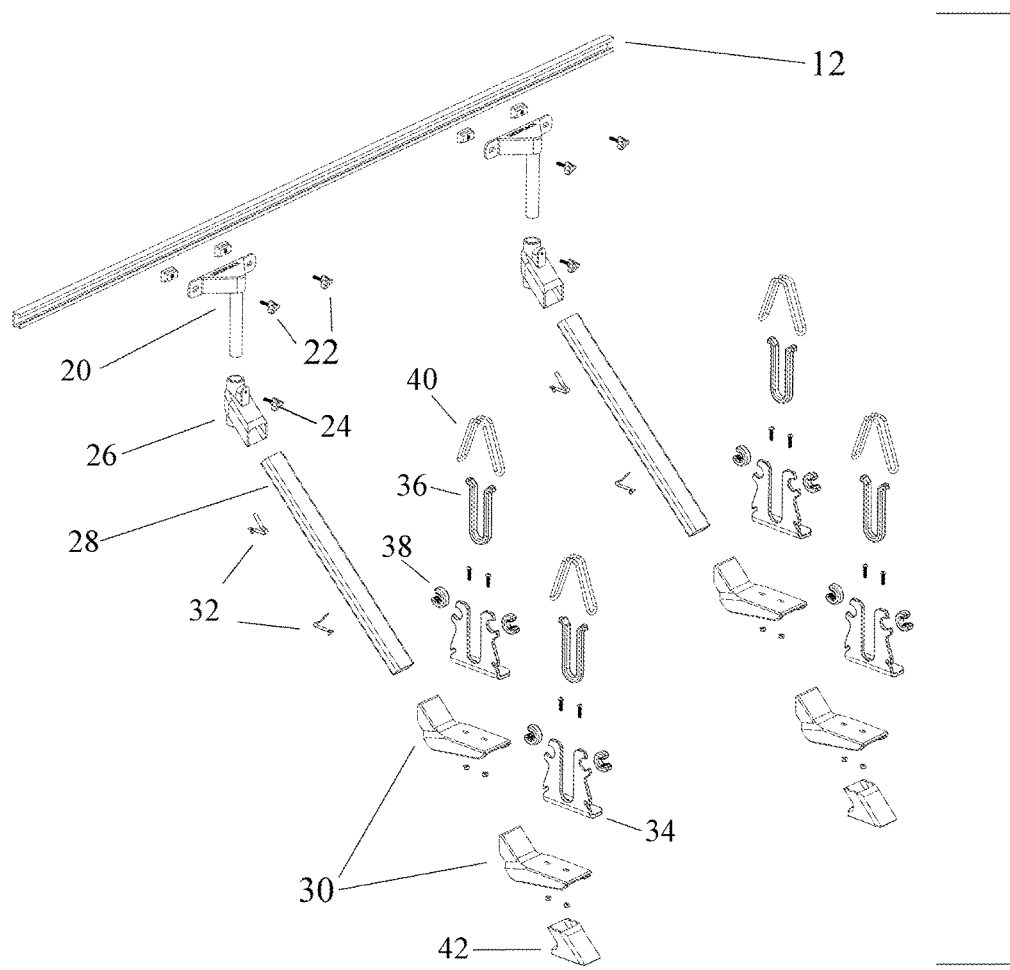

FIG. 4 illustrates an exploded perspective view of the empty equipment mounting system shown in FIG. 3.

Figure 5:
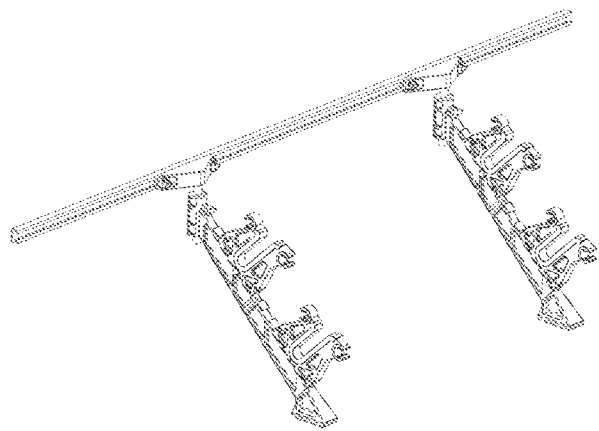

FIG. 5 illustrates a perspective view of an empty modular equipment mounting system, in accordance with an embodiment of the present disclosure.

Figure 6:
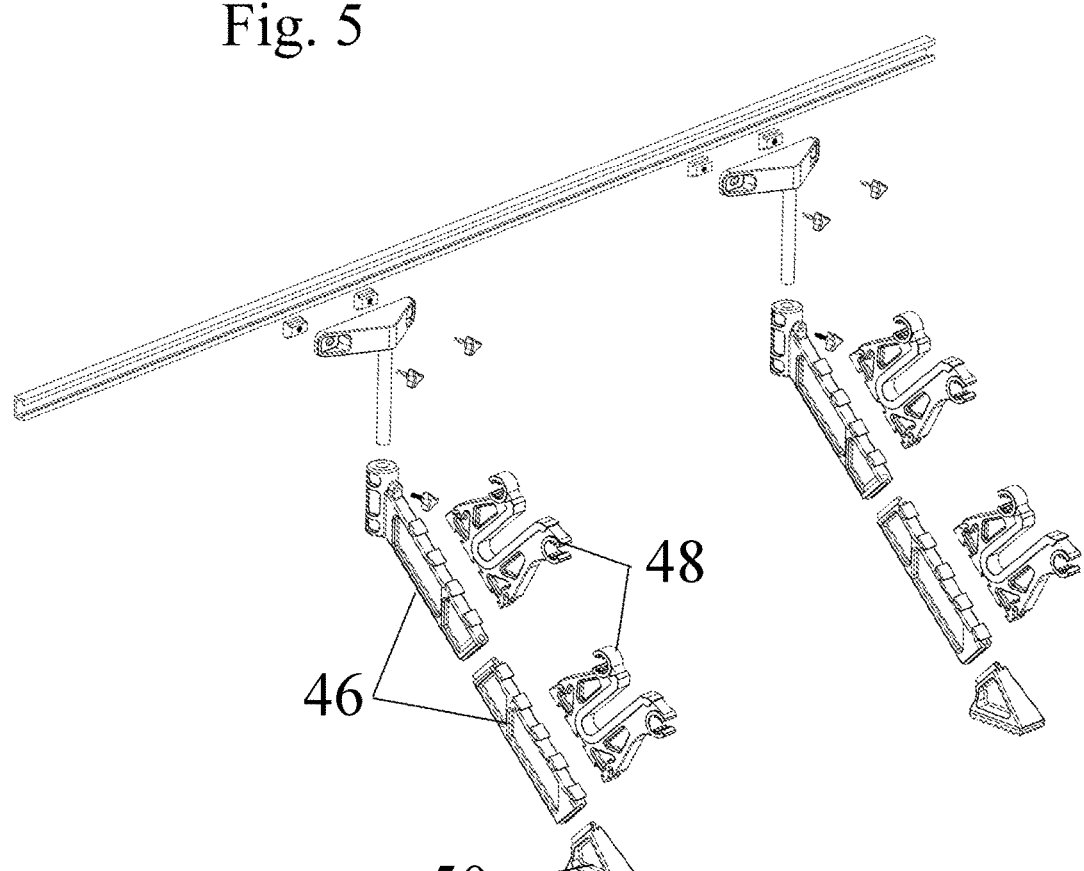

FIG. 6 illustrates an exploded perspective view of the equipment mounting system shown in FIG. 5.

Figure 7:
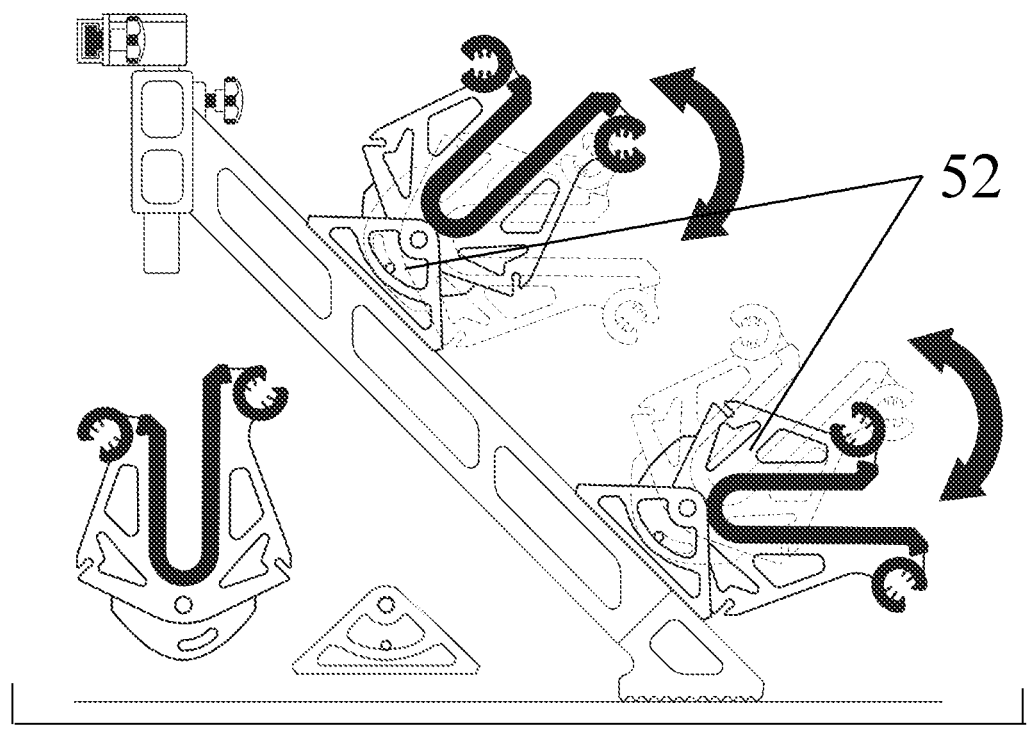

FIG. 7 illustrates a side view of an empty equipment mounting system with exemplary rotating ski brackets, in accordance with an embodiment of the present disclosure.

Figure 8:
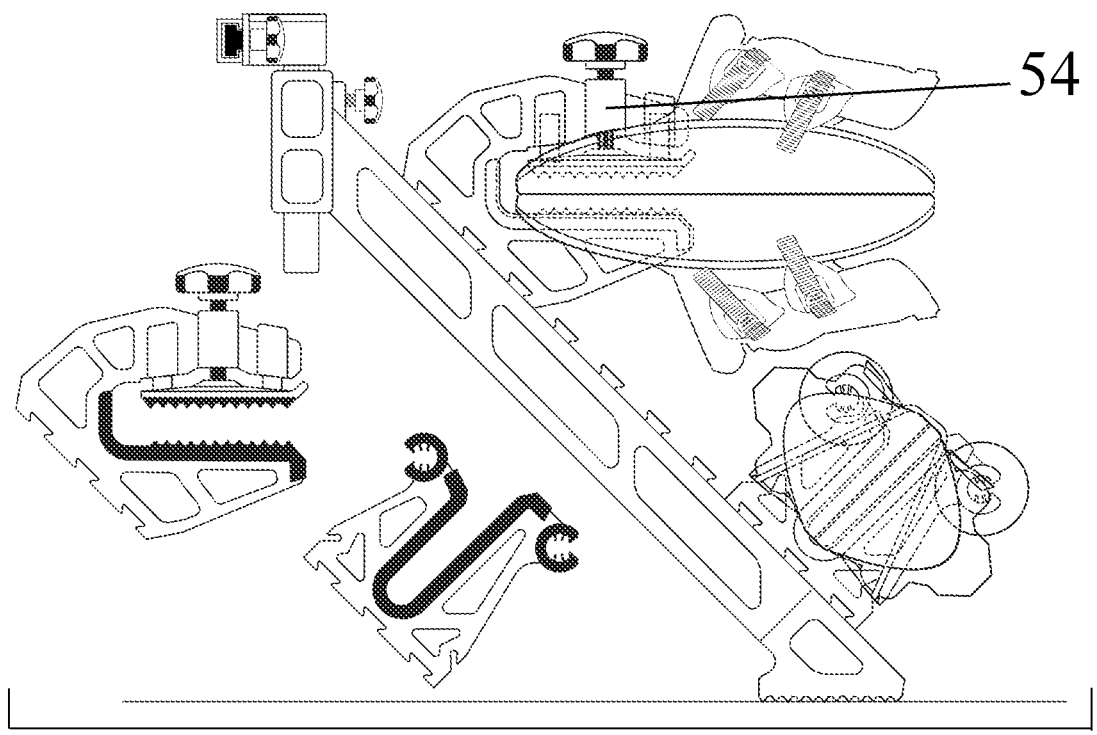

FIG. 8 illustrates a side view of an empty modular equipment mounting system with exemplary snowboard clamping bracket and ski bracket.

Figure 9:
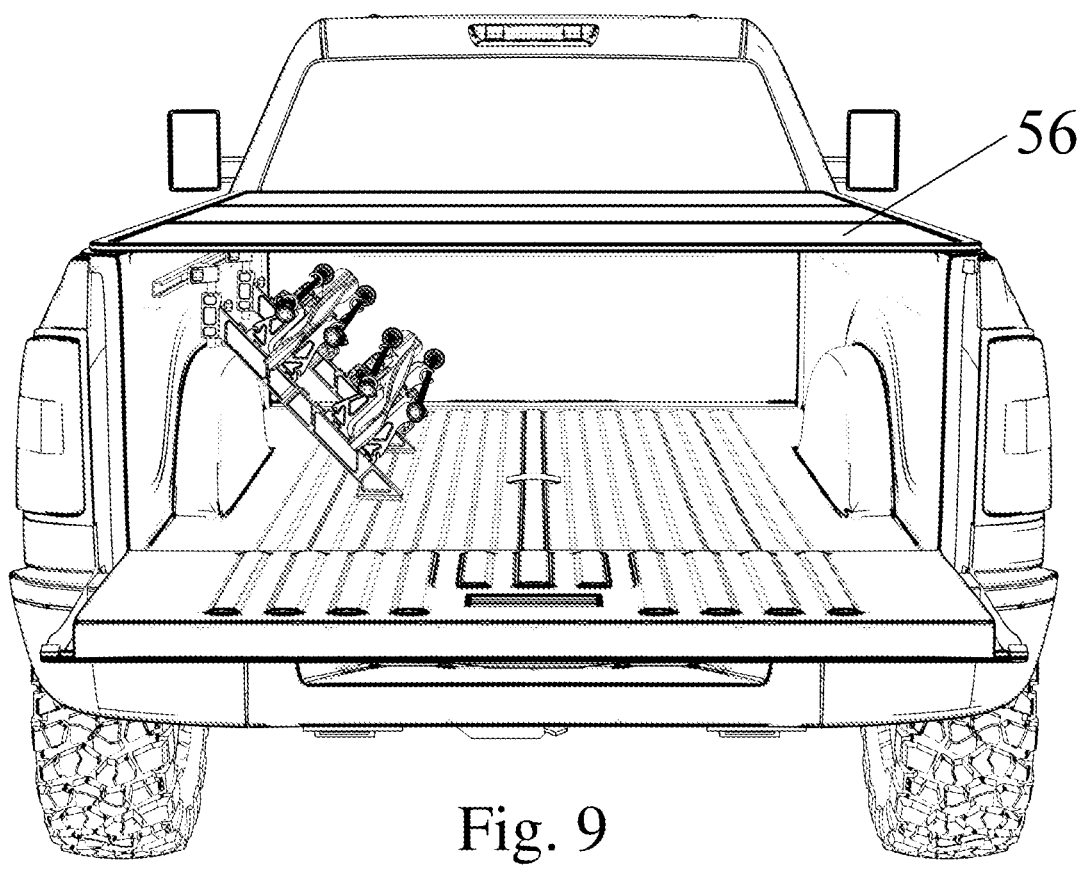

FIG. 9 illustrates a rear view of an equipment mounting system in use above a wheel well and under a bed cover.

Corresponding reference characters indicate corresponding components throughout the several figures of the Drawings.

2. NEW REFERENCES

10 Equipment Mounting System
12 Siderails
14 Front rail
16 Vehicle Bed
18 Rack Assembly
20 Vehicle Mounting Bracket
22 Vehicle Mounting Bracket Fastener
24 Locking Mechanism
26 Rotating Pivot
28 Diagonal Extension
30 Equipment Bracket Base
32 Equipment Bracket Base Fasteners
34 Equipment Bracket
36 Ski Fittings
38 Ski Pole Fittings
40 Rubber Attachment
42 Base
44 Wheel Well 46 Modular Diagonal Extension
48 Modular Equipment Bracket
50 Modular Base
52 Rotating Equipment Bracket
54 Clamping Bracket
56 Bed Cover

DETAILED DESCRIPTION

The following description is not to be taken in a limiting sense but is made merely for the purpose of describing the general principles of exemplary embodiments, no limitation of the scope of the invention is thereby intended. The phrases: "in one embodiment," "in an embodiment," and similar language throughout this specification may, but do not necessarily, all refer to the same embodiment. The phrases "at least one," "one or more," and "and/or" are open-ended expressions that are both conjunctive and disjunctive in operation. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably and are understood to mean open sets of options; such as, the elements A+B and any additional element C. The described features, structures, methods, steps, or characteristics of the present disclosure may be combined in any suitable manner in one or more embodiments. In other instances, well-known structures, materials, or operations are not shown or described in detail to avoid obscuring aspects of the present disclosure. Further, all numbers expressing dimensions, physical characteristics, and so forth, used in the specification and claims are to be understood as being modified in all instances by the term "about".

Regarding the illustrations, as used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

For the purposes of promoting an understanding of the principles of the present invention, reference will now be made to the embodiments illustrated in the drawings and specific language will be used to describe the same.

FIG. 1 illustrates a perspective view of one embodiment of an equipment mounting system 10 in use storing equipment. FIG. 2 illustrates the same embodiment of an equipment mounting system 10 shown in FIG. 1, except the equipment mounting system 10 is folded against a sidewall of a truck bed in a storage position. The mounting system 10 may attach to the siderails 12 on either side of the bed of a vehicle bed 16 or to the front rail 14 at the front of the bed of a vehicle 16. As seen in FIG. 1, when in use the equipment mounting system 10 extends into the vehicle bed 16 of a vehicle. As seen in FIG. 2, when not in use the equipment mounting system 10 collapses against the side of the vehicle bed 16 of a vehicle allowing the use of the full truck bed for storage of equipment.

The equipment mounting system 10 can be mounted in any vehicle or in trailers with the enough room, but it is anticipated that it will primarily be used over the wheel well 42 in the bed of pickup trucks which typically have factory installed siderails 12 and a front rail 14; however, such siderails 12 and front rails 14 may be an aftermarket installation in any vehicle or trailer. Pickup trucks typically have standardized siderails 12 and front rails 14 called "T-track" mounting rails that are well known in the art. "T-track" mounting rails have a "T"-shaped slot that receives a post (e.g., a fastener such as a bolt) that is used with a complementary nut to attach the rail 12 to a vehicle. It will be appreciated that the fastener-nut arrangement can be reversed such that the nut is placed in the T-shaped slot. In one example, the fastener or nut that is inserted into the T-shaped slot can have 'roller' functionality. That is, the roller fastener 20 (such as a roller nut) reduces friction when moved along the T-slot so that the equipment mounting system 10 can be mounted to the rails 12 or 14 and easily slide back and forth along the rails. A locking mechanism 22 such as a knob with a threaded post can secure the equipment mounting system 10 in a desired position.

Various fasteners may be used to connect components herein. For example, bolts and screws may be selected from button front socket style that incorporate a pin in the center of the recessed hex socket so a common "Allen" wrench, star or "Torx" bit without a hole in the end can be inserted. Spanner type bolt fronts or tri-groove nuts may also be selected. Such exemplary fasteners provide additional security in that the tools to remove such fasteners are less commonly available than traditional fasteners.

FIG. 3 illustrates a perspective view of an embodiment of an empty equipment mounting system 10. FIG. 4 shows an exploded illustration of the embodiment shown in FIG. 3. The embodiment of the equipment mounting system 10 shown in FIGS. 3 and 4 has separate rack assemblies 18 that may or may not each comprise one or more of the following elements: a vehicle mounting bracket 20 that is attachable to siderails 12 or front rails 14, vehicle mounting bracket fasteners 22, a locking mechanism 24, a rotating pivot 26 located near the top of the rack assembly 18, a diagonal extension 28 that extends diagonally from a vehicle mounting bracket 20 outward and downward to a vehicle bed 16, on said diagonal extension 28 there may be one or more equipment bracket bases 30, the equipment bracket bases 30 may be attached to the diagonal extension 28 with equipment bracket base fasteners 32, equipment bracket bases 30 may have integrated or attached equipment brackets 34, and a movable base 42 located at the bottom of said diagonal extension 28. Said equipment bracket 34 can be of any form and attach any equipment. In a preferred embodiment, said equipment brackets 32 may have ski fittings 36 and ski pole fittings 38; said ski fittings 36 and ski pole fittings 38 may also comprise rubber attachments 40 to keep stored skis and poles in place to prevent damage during transit. The preferred embodiment of the equipment mounting system 10 has two or more separate rack assemblies 18.

The vehicle mounting brackets 20 can slide back and forth on the vehicle rails 12 or 14 making them easier to stored out of the way when not in use. The rotating pivot 26 allows the rack assembly 18 to rotate the base 42 until it is extended outward placing the equipment brackets 34 in a functional arrangement or inward against the side of the vehicles bed to store the rack assembly out of the way. This function allows the rack assembly 18 to remain in the vehicle at all times without the need to remove the rack assembly 18 to full utilize the bed of the vehicle. Additionally, the combination of the sliding mounting brackets 18, the diagonal extension 26, and the rotating pivot 24 allows the rack assembly 18 to move into a storage position flat against the side of the vehicle while the vehicle mounting brackets 22 are attached above a wheel well 44 (shown in FIG. 1).

FIG. 5 illustrates an embodiment of a perspective view of an empty modular equipment mounting system 10. FIG. 6 shows an exploded illustration of the modular embodiment shown in FIG. 5. The modular embodiment allows the equipment mounting system 10 to be packed into a smaller container and for pieces of the equipment mounting system 10 to be interchanged easily for increased functionality. The modular components may couple with pressure fittings. The embodiment of the equipment mounting system 10 shown in FIGS. 5 and 6 may comprise the elements shown in FIGS. 3 and 4, and additionally: a modular diagonal extension 46 that can uncouple into two or more pieces and can couple directly to a modular equipment bracket 48 or a modular base 50. This embodiment allows for modular equipment brackets 48 for different types of equipment or materials to easily be exchanged without the need to detach any other part of the rack assembly, such as exchanging ski fittings 36 and ski pole fittings 38 for snowboard 54, tool, or material fittings with pressure fittings.

FIG. 7 illustrates a side view of an embodiment of an empty equipment mounting system further comprising rotating equipment brackets 52 allowing equipment to be stored in a more secure upright position and released in a more convenient sideways position. Such rotating equipment brackets 52 may be modular.

FIG. 8 illustrates a side view of an embodiment of an empty equipment mounting system further comprising a clamping bracket 54, which may be used to attach various types of tools or materials that are flat and long. In a preferred embodiment the clamping bracket 54 is used to attached snowboards. Said clamping bracket 54 may be modular and may be variably positioned along the Diagonal Extension 28 or Modular Diagonal Extension 46.

The equipment bracket 34 may be designed to accommodate and securely hold equipment including, but not limited to, various sizes and types of: ski poles, snowboards, wakeboards, surfboards, paddleboards, paddles, bicycles, fishing rods, tackle boxes, rifles and their cases, ammunition, ice chest type coolers, beverage dispensing jugs or vessels, barbecue grills and smokers, landscaping tools like shovels, rakes, garden tools, powered weed trimmers, chainsaws, axes, power equipment for job-site contractors, tool chests, various types of components organizers, and folding work tables or benchtops.

It is contemplated that components of the mounting system 10 include relatively light-weight material such as aluminum, plastics, rubbers, cast resin like fiberglass, carbon fiber, fiber reinforced materials; and made by injection molding or extrusion; further, strategic weight saving removal or cored out material may be utilized in structural components, or it may have a design incorporating thinner wall structural ribbing to maintain stress load integrity while keeping weight minimized.

FIG. 9 illustrates a rear view of an equipment mounting system in use above a wheel well and under a bed cover. The design of the equipment mounting system allows it to be installed, used, and stored while connected to the siderails of a pickup truck above the wheel well while still allowing for a bed cover 56 that is not significantly above the top of the perimeter of the bed of a truck, which may be a tonneau cover, to be used over the equipment mounting system 10.

The scope of the present disclosure fully encompasses other embodiments which may become obvious to those skilled in the art, and is to be limited, accordingly, by nothing other than the appended claims. All structural and functional equivalents to the elements of the above-described preferred embodiment and additional embodiments as regarded by those of ordinary skill in the art are hereby expressly incorporated by reference and are intended to be encompassed by the present claims. Furthermore, no element, component, or method step in the present disclosure is intended to be dedicated to the public regardless of whether the element, component, or method step is explicitly recited in the claims.

What is claimed is:

1. A vehicle equipment mounting system, comprising:
   a vehicle mounting bracket slidably attachable to a siderail or a front rail; wherein said siderail or front rail are attached along a wall and above a wheel well in a bed of a vehicle; and wherein said siderail or front rail comprises a slotted channel running its length;
   a rotating pivot connected to said vehicle mounting bracket;
   a diagonal extension extending downward to a bed of a vehicle with a slidable base attached to said rotating pivot;
   an equipment mounting bracket attached to said diagonal extension;
   wherein said diagonal extension and said equipment mounting bracket are rotatable around said rotating pivot attached to said vehicle mounting bracket attachable to said siderail or said front rail in a bed of a vehicle such that they rotate outward from said attachable siderail or said front rail to make said equipment mounting bracket functional and rotate inward towards said attachable siderail or said attachable front rail against a side of said vehicle bed.

2. The mounting system of claim 1, wherein said vehicle mounting bracket can be attached above a wheel well of a vehicle and still rotate against a side of said vehicle bed without coming into contact with said wheel well.

3. The mounting system of claim 2, wherein said vehicle equipment mounting system can be attached below a bed cover that is not significantly above a top of a perimeter of a bed of a pickup truck.

4. The mounting system of claim 1, wherein said vehicle mounting bracket, said rotating pivot, said diagonal extension, and said equipment mounting bracket combine to form a rack assembly and said mounting system comprises two or more of said rack assembly.

5. The mounting system of claim 4, wherein said vehicle mounting bracket can be attached above a wheel well of a vehicle and still rotate against a side of said vehicle bed without coming into contact with said wheel well.

6. The mounting system of claim 5, wherein said vehicle equipment mounting system can be attached below a bed cover that is not significantly above a top of a perimeter of a bed of a pickup truck.

7. The mounting system of claim 1, further comprising a locking mechanism that locks said rotating pivot from pivoting.

8. The mounting system of claim 1, wherein said diagonal extension is modular and can detach into two or more pieces.

9. The mounting system of claim 8, wherein said modular diagonal extension further comprises a modular base.

10. The mounting system of claim 8, wherein said two or more pieces of said modular diagonal extension are coupled with pressure fittings.

11. The mounting system of claim 1, wherein said equipment mounting bracket is modular.

12. The mounting system of claim 11, wherein said modular equipment mounting bracket is coupled to said diagonal extension with pressure fittings.

13. The mounting system of claim 1, wherein said equipment mounting bracket rotates.

14. The mounting system of claim 1, wherein said equipment mounting bracket clamps.

15. The mounting system of claim 1, wherein said equipment mounting bracket further comprising fittings for snowboards.

16. The mounting system of claim 1, wherein said equipment mounting bracket further comprising fittings for skies.

17. The mounting system of claim 1, wherein said equipment mounting bracket further comprising fittings for ski poles.

18. The mounting system of claim 1, wherein said equipment mounting bracket further comprising rubber attachments.

\* \* \* \* \*